Aug. 9, 1966  S. CECIL  3,265,856
WELDING APPARATUS
Filed Oct. 20, 1965  2 Sheets-Sheet 2

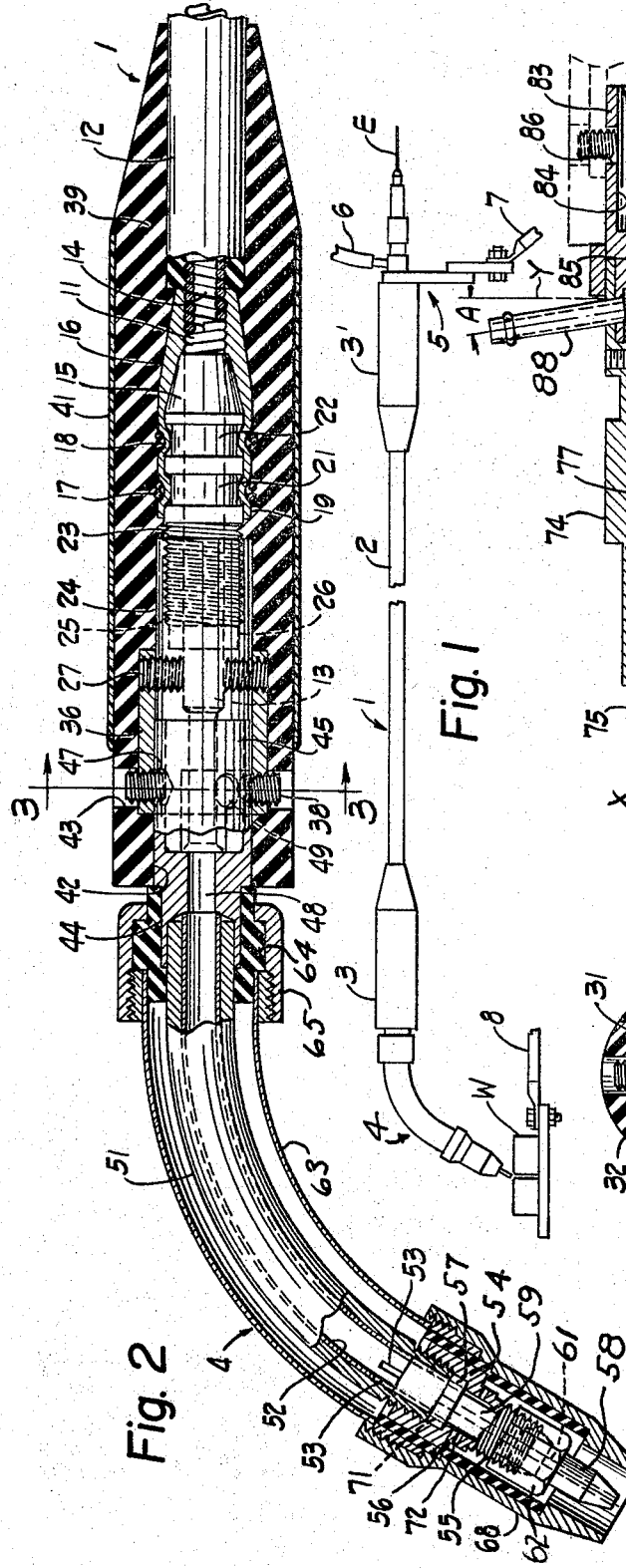

INVENTOR.
SHELBY CECIL
BY Bosworth, Sessions,
Henstrom & Knowles
ATTORNEYS.

United States Patent Office 3,265,856
Patented August 9, 1966

3,265,856
WELDING APPARATUS
Shelby Cecil, Cleveland, Ohio, assignor to X3 Corporation, Cleveland, Ohio, a corporation of Ohio
Filed Oct. 20, 1965, Ser. No. 498,649
14 Claims. (Cl. 219—130)

This invention relates to apparatus for gas shielded consumable electrode arc welding, and more particularly to such apparatus comprising a welding gun and a flexible cable for the conveyance to the welding gun of a consumable electrode in the form of a wire, shielding gas and electrical current.

It is often desired to use a wire electrode that is fed into a welding zone by a gun that is connected to a cable that carries a consumable wire electrode and also supplies electrical current to such electrode, the electrode being connected to one side of an electrical current supply circuit the other side of which is connected to the work to be welded. The work to be welded thus constitutes one of the electrodes between which the welding arc is maintained, the other being the wire electrode supplied by the gun.

It is common practice in arc welding to surround the welding zone with a shielding gas to prevent extraction from the ambient air of contaminants, such as oxygen or nitrogen, which can have a deleterious effect on the metal being welded. The shielding gas may be an inert gas such as helium or argon, and preferably is continuously supplied to form a shield or curtain around the tip of the electrode in the welding zone.

Conventional apparatus for such welding heretofore has embodied a cable through which the wire electrode passes and which conducts the electrical current from the current supply to the welding gun. However, in such conventional apparatus the shielding gas usually has been supplied by a separate hose, usually clipped to such cable and connected at one end to a source of gas and at the other end to the welding gun. This hose, being separate from the cable, often tends to become entangled by objects in the vicinity of the welding zone, and also often is in the way of the operator and impairs his welding efficiency.

The typical prior welding cable has a connecting means at one end to which the welding head or gun is attached, and a different type of connecting means at the other end to which was attached the guide or other means for supplying the wire that passed through the cable. However, the end of the cable near the welding head usually tends to wear most since it is handled by the operator, and is often dragged over the floor or supporting means when it is laid down and picked up in service. When the cable tends to become excessively worn, the usual practice is to cut off the worn end of the cable and reattach the connecting means. This is a laborious and time-consuming process and inevitably results in a cable that is undesirably short. Furthermore, in prior apparatus the welding gun is generally connected to the end of the cable by rather cumbersome means that requires considerable time to effect a gun change, as is often necessary in welding activities.

It is the object of the present invention to provide welding apparatus, including a welding cable, that overcomes as many of the above disadvantages as is desired. Another object is the provision of such apparatus in which the welding electrode wire, shielding gas, and the electrical current are all passed through the same cable. A further object is the provision of such apparatus providing improved quickly connectible and disconnectible means for connecting the gun or other connected means such as a feeder means to the cable while providing an electrically conductive and gas-tight joint. Another object is the provision of such apparatus for providing improved means for feeding gas and electrode wire to the interior of the cable, which feeder may cooperate with the improved connecting means on the cable. Another object is the provision of such apparatus in which the welding cable has identical connecting means at both ends so that both ends of the cable can be disconnected from the welding gun and from the gas and welding supply means and the ends of the cable can be interchanged to equalize wear. A further object is the provision of such apparatus which is durable and can be manufactured at a reasonable cost.

These and other objects of the invention will become apparent from the following description of a preferred embodiment in connection with the accompanying drawings in which:

FIGURE 1 is an exterior view to a small scale of apparatus embodying the invention, showing the welding cable having identical connector means at both ends, one connector means being connected to the welding gun and the other connector means being connected to a feeder for feeding electrode wire and shielding gas into the cable;

FIGURE 2 is a sectional elevation to an enlarged scale of one end of the cable, showing the construction of one of the identical connector means, and also the internal construction of the welding gun connected to the connector means;

FIGURE 3 is a section along line 3—3 of FIGURE 2 and to the same scale;

Figure 6:
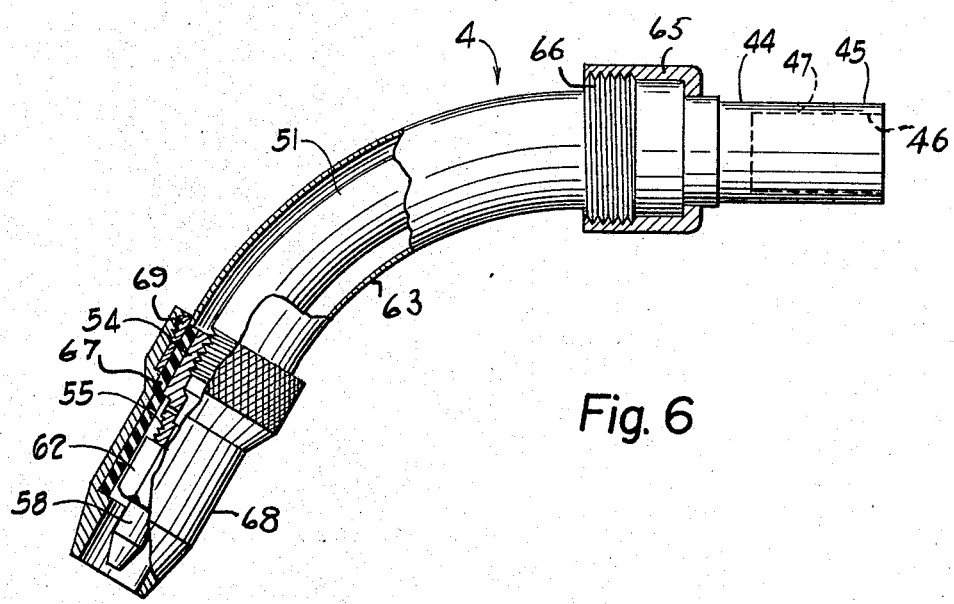
Figure 4:
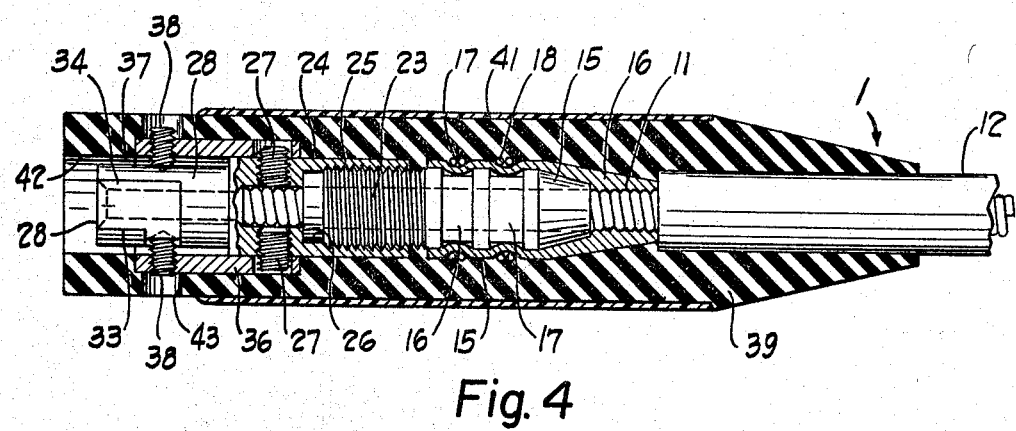
FIGURE 4 is a sectional elevation to the same scale as FIGURE 2 through one of the connector means of the cable, when it is unconnected to any connected part.
Figure 5:
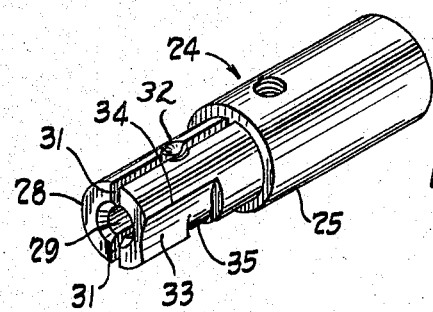
FIGURE 5 is a perspective, essentially to the scale of FIGURES 2–4, inclusive, of one of the internal parts of the connector means of FIGURES 2, 3 and 4.

FIGURE 6 is a side elevation of a welding gun like that shown in FIGURE 2, parts of this gun being shown in external elevation and parts being shown in section elevation for clearness; and FIGURE 7 is a sectional elevation, to the same scale as FIGURES 2 to 6, inclusive, of a feeder for feeding wire electrode and gas to the other end of the cable, this feeder being adapted to fit into and be connected to one of the connector means shown in FIGURES 2 and 4 at an end of the cable.

The apparatus shown in FIGURE 1 comprises a cable 1 having a central portion 2, identical connector means portions 3 and 3', a welding gun 4 connected to one of the portions 3 and feeder 5 connected to the other portion 3'. An electrode wire E is fed through the cable by feeder 5 and exits through the gun 4. Gas is supplied by hose 6 to feeder 5 and is discharged through gun 4. Feeder 5 is connected by wire 7 to one side of an electrical energy supply circuit, not shown, while the work W is connected by wire 8 to the other side of the circuit.

As shown in FIGURES 2, 3, 4 and 5, the cable 1 comprises an electrically conductive flexible tubular core 11, preferably formed of helical turns of metal strand material, that is surrounded by a sheath 12 formed of rubber, synthetic rubber, plastic material, or other suitable material that has electrical insulating and preferably gas-sealing properties; such material is preferably conventionally bonded to the core 11 and extends throughout portion 2 of the cable and into portions 3 and 3'. An end 13 of the core 11 projects from each end of the sheath 12. A gas-tight passage 14 extends throughout the core 11.

In each connector means 3 and 3', of the illustrated embodiment, bushing 15 formed of strong electrically conductive material, such as brass, is mounted on the projecting end 13 of the core at a substantial distance inward from its free end, the bushing being rigidly fixed on core 11 in electrically conductive relation by a molded-in-place connecting body 16 of fusible material such as lead that adheres firmly to the bushing and the core; turns 17 and 18 of wire are tightly wound around a sleeve portion 19 of the body 16 to force it into grooves 21 and 22 of the bushing 15 to aid in firmly holding it in place. Bushing 15 also has an externally threaded portion 23 that extends toward but stops short of the free end of portion 13 of core 11.

An intermediate connector member 24 (FIGURES 2, 4 and 5) extends over the remainder of portion 13 of core 11. Portion 24 has a body 25 that has an internally threaded socket 26 threaded onto portion 23 of bushing 15. Set screws 27 threaded into member 24 rigidly locate member 24 in place on core 11 and also insure good electrical contact with the core. Connector member 24 also has a portion 28, preferably cylindrical, that projects from body 25. An axial bore 29 extends through member 24 and communicates with passage 14 in core 11.

Portion 28 also has slots 31, shown vertical, extending inwardly from its free end to the body 25, there being a set screw seat 32 intersecting each slot at a suitable location between the ends of portion 28. On its exterior, portion 28 also has a cam-shaped locking groove 33 having an axially-extending portion 34 and a transversely-extending portion 35 to form a quickly securable and releasable lock with a mating portion of a gun or feeder, as will be described later.

A sleeve 36 is rigidly fixed to body portion 25 of member 24, preferably by the set screws 27 that are threaded through sleeve 36 as well as member 24. Sleeve 36 projects over and surrounds projecting portion 28 of member 21, its preferably cylindrical inner surface being spaced from portion 25 to form a circumferential annular space 37. Sleeve 36 extends for a major portion of the length of portion 28 but stops short of its free end as shown in FIGURE 4.

Sleeve 36 also has threaded therein two set screws 38 the inner ends of which are located opposite the seats 32 of portion 28. When these set screws are tightened, they tend to spread apart the two sections of portion 28 that are separated by slots 31, for reasons later indicated.

All of the above parts are enclosed in a body 39 of natural or synthetic rubber or plastic material that has electrical insulating and preferably gas-sealing properties. It is preferably molded over such parts; it also preferably has an outer layer 41 providing added gripping friction and protection against wear. Body 39 has an opening 42 at its free end that is no larger than, and preferably slightly smaller than the inner bore of sleeve 36; body 39 also has two openings 43 permitting access to set screws 38.

The gun 4, shown in detail in FIGURES 2, 3, and 6, is adapted to make electrically conductive and gas-tight engagement with the connecting means 3 or 3' of cable 1 and to feed the wire E to the welding zone. This gun comprises a connecting portion 44 having a sleeve portion 45, containing a socket 46, that fits snugly between the inner surface of sleeve 36 and the outer surface of portion 28 of the member 24. The socket 46 is sized to permit the free end of connector portion 44 of the gun to fit closely adjacent the end of body portion 25 of member 24, and to permit the free end of member 24 to fit closely adjacent the bottom of socket 46. Two unthreaded openings 47 extend through sleeve portion 45 at locations that permit passage of set screws 38. Connector portion 44 has an axial bore 48 therethrough approximating in size the bore 29 through member 24. In its socket 46 it has fixed a protrusion 49 that is shaped and located to engage the locking groove 33 and particularly the transverse portion 35 thereof to lock the gun in place.

A pipe 51 of copper or other suitable metal is fixed to portion 44, as by silver soldering. This pipe has fixed in its interior, as by silver soldering, an internal sleeve or tube 52 formed of a metal such as brass that has greater wear-resistance than copper. The outer end of this inner tube stops short of the outer end of pipe 51 and is slotted at 53 to permit gas flow outwardly to the tip of the gun.

Threaded onto the outer end of the pipe 52 is an adapter 54 having an externally threaded lower portion 55. This adapter has a bore 56 that matches the opening in the pipe 51, and clamps in place between an internal shoulder on the adapter and the end of pipe 51 an external flange 57 on a welding tip member 58 formed of a suitable wear- and heat-resistant metal. Tip member 58 has a barrel 59 having an axial bore 61 sized to fit closely but permit ready sliding passage of the electrode wire E. The upper end of the bore is flared to permit ready entrance of the wire on starting. The lower portion of the barrel is clamped in the adapter by a nut 62 on threaded portion 55 of the adapter.

The gun includes a curved tubular housing member 63 the upper end of which is clamped in place on connector portion 44 by an insulating spacer member 64 and knurled nut 65 that engages a shoulder on the insulating member and is threaded onto threads 66 on the upper end of member 63. The lower end of member 63 fits over an insulating sleeve 67 that fits on adapter 54; a nozzle member 68 is threaded onto lower threads 69 on member 63 outside insulating sleeve 67.

Gas emanating from cable 1 and flowing through tube 52 inside the gun passes out through slots 53 into the annular space between the upper end of barrel 59 of member 58 and the lower end of the opening in pipe 51, through openings 71 in the flange 57, and into the space between the bore 57 of adapter 56 and the barrel 59 of member 58, and thence out through radial openings 72 which deliver the gas inside the sleeve 67. The gas cannot pass upwardly into housing 63 because of the seal formed by insulating sleeve 67, the inside of housing 63, and the enlarged upper portion of adapter 54; therefore the gas passes out through the discharge opening in nozzle 68 in close proximity to where the weld wire emanates from tip member 58.

It is apparent that merely by loosening set screws 38 and partially turning the entire gun assembly so its protrusion 49 moves from groove portion 35 into axial groove portion 34, and then moving the gun axially of the connecting portion 3, the entire gun can be removed. The gun can be easily and quickly connected to the cable by performing these operations in reverse order. It is also apparent that the housing 63 can be removed from the gun merely by loosening the nut 65 and sliding the housing endwise off the internal structure. It is also apparent that either by doing this or by removing the nozzle member 68, the tip member 58 can be exposed for inspection, cleaning or replacement.

The feeder 5 attached to cable 1, shown in detail in FIGURE 7, comprises a body 74 having at its rear end a hardened steel guide 75 threaded into the body 74. Guide 75 has an opening 76 that closely slidably fits the size of electrode wire E to be used; body 74 has a larger opening 77 aligned with opening 76 of guide 75. Another hardened steel guide 78 is mounted in the other end of body 74 and has an opening 79 coaxial with openings 76 and 77 and slightly smaller than opening 76. This guide is demountably held in place by two set screws 81.

A feeder connector portion 82 is demountably fixed to the front end of body 74 by a press fit. It has a sleeve portion 83 having outer cylindrical surface sized to fit snugly within sleeve 36 of either connector portion 3 or 3' of the cable, and an inner socket 84 sized to fit snugly over the projecting portion 28 of the connector member 24 of the cable. This portion 82 has an opening 85 considerably larger than and coaxial with openings 76, 77 and 89; it has diametrically opposed openings 86 that align with the set screws 38 of the cable to permit the screws to pass through sleeve portion 83 to engage the slotted portion 28 of the cable. A protuberance 87 fixed in socket 84 is adapted to engage locking slot 33 on connector portion 28 of the cable to lock the feeder to the cable.

The gas supply system comprises a gas inlet tube 88 discharging into a chamber 89 located in the feeder and surrounding the discharge portion of the guide 78. This tube discharges the gas into the chamber at an angle, preferably about 8° from a line Y normal to the axis X of the wire guide passages 76 and 79, the angle sloping from the rear of the feeder toward the front of the feeder. This angle is important in preventing backflow of gas out through the rear of the feeder. The chamber 89, the tapered shape of the front of guide 78, the location of the discharge end of guide near the front end of the chamber and at the flared end 91 are all important in permitting expansion of gas before it passes into the cable, and minimizing possibilities of turbulence of the gas as it discharges from the gun.

The inlet tube 88 may be connected, as shown in FIGURE 1, to the hose 6 connected to a suitable source of shielding gas at a suitable pressure which may be in the neighborhood of 2 or 3 pounds per square inch. The feeder 5 also has a bracket 92 adapted to be connected to a lead 7 connected to the electrical current supply. In the illustrated embodiment, the bracket is fixed, as by brazing or silver soldering, to connector portion 82.

The two guides 76 and 78 can be readily removed and replaced with other guides having differently sized passages to accommodate different sized welding wires. This is possible because the rear guide is threaded in place, while the front guide is accessible because the parts 74 and 82 are separable and because the guide is held in place by set screws 81.

The feeder can be readily connected to one end of the cable by first unscrewing set screws 38 on the cable sufficiently to clear the inside of sleeve 36, then inserting the connector portion 82 of feeder 5 so its sleeve portion 83 fits into the space 37 and its socket receives projecting portion 28 of the cable connecting part 24, with the protuberance 87 first entering axial portion 34 of slot 33. The feeder is then partially turned relatively to the cable to lock protuberance 87 in slot portion 35 and set screws 38 are turned to spread the slotted parts of portion 28 to make good electrical contact. The feeder can be rapidly and easily disconnected by reversal of the order of operations.

It is apparent, therefore, that in the illustrated apparatus, the cable 1 has two identical connecting portions 3 and 3'. Each of these connecting portions is adapted to make a quick-connect connection to a welding gun such as the gun 4 illustrated or to a feeder unit such as the feeder 5 illustrated.

These connections are gas-tight, so that shielding gas, supplied through hose 6 and inlet tube 88 passes through the core 11 of cable 1 and out through the gun 4 to shield the welding zone. Moreover, the welding wire E supplied through the feeder 5 and cable 1 discharges from the gun 4. This welding wire is supplied with electrical current from wire 7 connected to feeder 5, which is in good electrical contact with the core 11 which, in turn, is in good electrical contact with the copper pipe 51 of the gun and with the welding tip member 58. Therefore, both the gun and feeder can be quickly connected to the cable with gas-tight connections and good electrical connections. The spreading action of the split halves of the projecting portion 28 at each end of the cable, provided by the set screws 37, insures excellent electrical connection between the connector members 24 and the socketed connection portions of the gun and feeder.

It is apparent, therefore, that the illustrated embodiment provides all of the advantages and eliminates all of the disadvantages previously described.

It is also apparent that various modifications can be made in the illustrated embodiment without departing from the spirit of the invention. It is intended that the patent shall cover, by suitable expression in the appended claims, whatever features of patentable novelty reside in the invention.

What is claimed is:

1. A welding cable comprising a flexible tubular electrically conductive core, a flexible resilient covering for said core, said core and said covering providing a gas-tight conduit for gas through said core, and connecting means at each end of said cable for connecting said core to means adapted to carry an electrode wire passing through said core and also adapted to carry gas passing through said core and adapted to conduct electrical current, said connecting means being adapted to make a gas-tight and electrically conductive connection wtih said conductive core.

2. The cable of claim 1 in which the connecting means at both ends of the cable are identical.

3. The cable of claim 1 in which said connecting means at at least one end of said cable comprises a metal connecting portion fixed in electrically conductive relation to said core, said connecting portion having an axially-projecting portion extending toward the free end of said cable, said connecting portion having at least one slot therein extending generally axially thereof, a sleeve portion surrounding said connecting portion and spaced radially therefrom to define a circumferential space around said axially-extending portion, and means mounted in said sleeve portion and adapted to be moved toward said projecting portion to engage said slot in said projecting portion to spread apart the portions of said projecting portion on each side of said slot.

4. The apparatus of claim 3 in which said projecting portion has a locking means adapted to cooperate with locking means on a connected member.

5. The cable of claim 3 having said connecting means at both ends of said cable.

6. The cable of claim 1 in which the connecting means at at least one end of said cable comprises a metallic connecting portion fixed to said core member in electrically conductive relation, said portion comprising a generally cylindrical projecting portion extending axially toward the free end of said cable, a slot extending in said axially-extending portion from its free end inwardly thereof, a sleeve having a generally cylindrical interior surface radially spaced from said projecting portion and fixed to said connecting portion, said sleeve extending for a major portion of the length of said projecting portion, and screw means threaded in said sleeve and adapted to engage the edges of said slot in said projecting portion in order to force apart the portions of said projecting portion on opposite sides of said slot.

7. Welding apparatus comprising: a welding cable comprising a flexible tubular metal core, flexible resilient covering means for said core, said core and said covering means providing a gas-tight conduit for said core, connecting means at at least one end of said cable, said connecting means on said cable comprising a metallic connector portion fixed to said core in electrically conductive relation and having an axially-extending passage communicating with the opening through said core, said connector portion having a projecting portion through which said passage extends and that extends axially toward the free end of said cable and has at least one slot therein extending generally axially from its free end of said projecting portion toward its supported end, a sleeve portion surrounding said projecting portion and radially spaced therefrom to define a generally circumferential space extending for a major portion of the length of said projection portion, means carried by said sleeve portion and adapted to be driven inwardly at the edge of said slot on said projecting portion to spread the parts of said projecting portion at the sides of said slot; and connected means connected to said connecting means on said cable, said connected means having a socketed portion adapted to fit over said projecting portion inside said sleeve portion and having a passage adapted to align with the passage in said projecting portion, said socketed portion having an opening therethrough permitting passage of said spreading means carried by said sleeve portion, whereby when said spreading means is actuated to spread said projecting portion effective electrical contact is established between said projecting portion of said connecting means of said cable and said socketed portion of said connected means and gas-tight connections are established between the passages through said projecting portion and said socketed portion.

8. The apparatus of claim 7 comprising locking means carried by said projecting portion and by said socketed portion adapted to engage to lock said socketed portion to said projecting portion.

9. The apparatus of claim 7 having such connecting means at both ends of said cable.

10. The apparatus of claim 9 in which the connected means at one end of said cable is a welding gun adapted to have welding wire and gas passed therethrough and adapted to conduct welding wire therethrough, and in which the connected means at the other end of said cable is feeding means adapted to feed gas and welding wire to said cable and adapted to conduct electrical current.

11. A welding gun for carrying gas and welding wire comprising a socketed portion at one end of the gun having through the bottom end of its socket an opening extending through said portion, a tubular portion connected at one end thereof to said socketed portion and having an opening therethrough communicating with the opening in said socketed portion, and a tip portion connected to the other end of said tubular portion, said tip portion comprising an opening therethrough for conducting and guiding said welding wire, means providing a gas flow passage that communicates with the interior of said tubular portion and with the space outside said guide means, and nozzle means surrounding said guide means and having its interior communicating with said passage, whereby gas from said tubular portion is supplied to the vicinity of wire emanating from said tip portion.

12. Feeder means for feeding welding wire and gas and supplying electricity to a welding cable, comprising a body, a passage for guiding welding wire through said body, a chamber within said body, wire-guiding means projecting into said chamber from one end thereof, a passage larger than the passage through said guiding means at the other end of said chamber through which wire and gas can leave said chamber, and means for supplying gas to said chamber.

13. The apparatus of claim 12 in which said means for supplying gas to the chamber is a tubular member and enters the chamber at an angle sloped toward the direction of travel of wire and gas through said chamber.

14. The feed member of claim 12 in which at the discharge end of said feed member said body has a socket into which said discharge passage discharges.

References Cited by the Examiner

UNITED STATES PATENTS

| | | | |
|---|---|---|---|
| 2,795,689 | 6/1957 | McNult | 219—125 |
| 2,817,749 | 12/1957 | Flood et al. | 219—130 |
| 3,098,892 | 7/1963 | Spade et al. | 219—136 X |
| 3,112,392 | 11/1963 | Orr et al. | 219—130 |
| 3,155,811 | 11/1964 | Adamson et al. | 219—130 |

RICHARD M. WOOD, *Primary Examiner*.